(12) United States Patent  (10) Patent No.: US 7,492,316 B1
Ameti et al.  (45) Date of Patent: Feb. 17, 2009

(54) WIRELESS TIME REFERENCE SYSTEM AND METHOD

(75) Inventors: Aitan Ameti, Germantown, MD (US); Keming Chen, Herndon, VA (US); Robert J. Fontana, Potomac, MD (US); Edward A. Richley, Gaithersburg, MD (US); Belinda Turner, Germantown, MD (US)

(73) Assignee: Multispectral Solutions, Inc., Germantown, MD (US)

( * ) Notice: Subject to any disclaimer, the term of this patent is extended or adjusted under 35 U.S.C. 154(b) by 27 days.

(21) Appl. No.: 11/480,982

(22) Filed: Jul. 6, 2006

Related U.S. Application Data (60) Provisional application No. 60/752,950, filed on Dec. 23, 2005.

(51) Int. Cl.
*G01S 3/02* (2006.01)
(52) U.S. Cl. ............................ 342/465; 342/463
(58) Field of Classification Search .............. 342/465, 342/387
See application file for complete search history.

(56) References Cited

U.S. PATENT DOCUMENTS

| 5,469,409 | A | 11/1995 | Anderson |
| 6,882,315 | B2 | 4/2005 | Richley |
| 2002/0135511 | A1* | 9/2002 | Zhao et al. ............. 342/357.02 |
| 2004/0108954 | A1* | 6/2004 | Richley et al. ............. 342/387 |
| 2005/0148346 | A1* | 7/2005 | Maloney et al. .......... 455/456.6 |

* cited by examiner

*Primary Examiner*—Thomas H Tarcza
*Assistant Examiner*—Nga X Nguyen
(74) *Attorney, Agent, or Firm*—McIntyre Harbin & King (57) ABSTRACT

Instead of normalizing time reference of independent spatially-located clocks using a reference tag transmission from known location, the present invention uses an interarrival time interval between a pulse pair of UWB pulses as a timing metric. Thus, a method of synchronizing spatially-located clock or normalizing time indications thereof comprises transmitting a UWB pulse pair, determining at first and second monitoring stations a respective count value indicative of a locally measured time interval between received pulse pairs, determining a ratio between clock counts of first and second monitoring stations, and utilizing the ratio to determine clock skew, e.g., a timing correction to be applied to respective local clocks of the monitoring stations. A corresponding system comprises a reference tag transmitter that transmits a pulse pair of UWB pulses to define a time reference interval, a first independent receiver that receives the pulse pair to generate a first count value indicative an interarrival interval between the pulse pair, a second independent receiver that receives the pulse pair to similarly generate a second count value, and a processor hub responsive to the count values to determine a ratio corresponding to the ratio of respective clock frequencies of the first and second receiver clocks. Once the correction is applied, time-of-arrival information from object tag transmissions may be used to determine object location with sub-foot position accuracies.

8 Claims, 9 Drawing Sheets

WIRELESS TIME REFERENCE SYSTEM AND METHOD

CROSS-REFERENCE TO RELATED PATENTS AND PATENT APPLICATIONS

This invention is related to commonly-owned U.S. Pat. No. 6,882,315 (Richley, et al.) issued Apr. 19, 2005 entitled "Object Location System and Method," which is incorporated herein by reference. This invention also claims the benefit of Provisional Application 60/752,950 filed Dec. 23, 2005 and entitled "Wireless Object Location System and Method."

BACKGROUND

This invention concerns timing synchronization or determination of time corrections to be applied to timing devices of independent RF receivers generally, but is disclosed herein in connection with implementation in a wireless object location system and method.

In U.S. Pat. No. 6,882,315 ("the '325 patent"), a precision object location system is described in which cycling of local clocks of multiple receivers was frequency-locked (but not necessarily phase-locked) with a common clock frequency (e.g., where a common clock signal is conveyed over low-cost CAT5 cables from a central processor/hub to each of the multiple receivers). Such a system may use an active (i.e., transmitting) reference tag to enable determination of or to compensate for relative phase offsets between individual clocks of the receivers. With the use of ultra wideband (UWB) or short pulse waveforms as timing signals, location accuracies and precisions within one foot were achieved. Synchronizing local receiver clocks is extremely important to obtaining precise positioning accuracy and much effort in the prior art has been directed to aligning timing references in each of multiple receivers or monitoring stations in a geopositioning or an object location system. Thus, shielded or unshielded (twisted wire pair) cabling was used to interlink the receivers via a common timing reference. Alternatively, where no wireline link is provided, prior untethered (i.e., wireless) systems utilized extremely accurate, albeit expensive, local timing references at each receiver but even then the timing accuracy of internal clock circuits and concomitant positioning accuracy is still subject to temperature changes, frequency drift or clock skew (which necessitated periodic synchronizing with a common source.

In many applications, particularly those outdoors or in areas in which conventional wiring is either not possible (e.g., on a large cattle ranch for tracking livestock) or exorbitantly expensive (e.g., within an oil refinery for tracking safety personnel), it is desirable to eliminate wire lines running from a central processor hub to individual receivers or monitoring stations. In furtherance of such goal, the present invention proposes an alternative system and method to obtain synchronization or offset information for the individual receivers.

In Anderson et al. (U.S. Pat. No. 5,469,409) ("the '409 patent"), a method is described to wirelessly phase-lock individual receivers that operate with independent internal local clocks having no common or external timing reference. Here, a reference tag is used to perform synchronization. In operation, a transmission from the reference tag is received by multiple independent receivers. Each receiver, knowing its own location and the exact position of the reference tag, may then calibrate its own clock by calculating/measuring the precise propagation time for the tag signal to reach the receiver. In addition, knowing the exact cable delay from each receiver's antenna/preamplifier (AP) node to a collector (C) node, a processor hub may also compensate for the relative timing offsets between the individual receivers. This computation is accomplished by subtracting the sum of the propagation time and cable delay from the measured arrival time of the reference tag transmission at each receiver (as measured in a local time coordinate system at the receiver). The resultant estimates (one for each receiver) of the epoch time of the reference tag transmission are then suitably adjusted and aligned by the central processor so as to provide a common time reference point for subsequent transmissions from other (non-reference or object) tags.

A disadvantage of Anderson's technique is that, if relatively inexpensive internal clocks are used as suggested, updates from the reference tag must be received at a sufficiently fast rate or clock drift between receivers (e.g., due to a simple frequency offset) will create significant location errors. In essence, Anderson "pins" the epoch time of a tag transmission event for all receivers after a single calibration, but does not compensate for time-of-arrival drift due to clock frequency offsets. For example, in an Anderson implementation, if one receiver's clock frequency differs from that of another receiver by 20 parts per million (ppm), a one nanosecond difference in reference tag times-of-arrival is accrued in 500 microseconds. Thus, a calibration cycle must occur every five milliseconds (or 200 times per second) to maintain an accuracy of ten nanoseconds, or approximately ten foot resolution (based on distance of RF signal propagation during ten nanoseconds).

The present disclosure describes a system and method for significantly improving performance over prior systems and methods, such as that contemplated by Anderson et al., while fully enabling a wireless implementation of methods and systems described in commonly-owned '315 patent without sacrificing positioning accuracy. The present invention additionally allows further improvements and advantages over the method and system described in the '325 patent.

SUMMARY OF THE INVENTION

According to a first aspect of the invention, a system provides normalization of time (e.g., synchronizing or calibrating clocks, or providing an indication of skew compensation) of local clock circuits of plural spatially-located monitoring stations. One embodiment comprises a reference transmitter to transmit at least two RF pulses (UWB) that define a time reference interval wherein local clock circuits have respective detection circuits that detect and measure time durations of the time reference interval at respective receivers of the monitoring stations, and a processing device that determines a relationship (e.g., ratio) between time durations measured at receivers of at least two monitoring stations and that effects normalization of time (e.g., calibration) of local clock circuits according to the relationship. Once normalized, the local clock circuits may accurately measure times-of-arrival of subsequent object tag transmissions in an object location system. The processing device may effect normalization of time-of-arrival measurements among receivers of the monitoring stations by controlling the frequency of at least one local clock circuit of a monitoring station to maintain the relationship fixed (e.g., one-to-one) with respect to a frequency of a local clock of a selected other (i.e., master) monitoring station.

In a more specific embodiment, each of the local clock circuits comprises a ring counter that detects and latches a clock count to measure the duration of the time reference interval and/or the processing device (i) wirelessly receives at a central processing hub digital information representing clock count information of the monitoring stations and time-of-arrival measurements of an object tag transmission and (ii) effects normalization of the time-of-arrival measurements according to a ratio of clock count information.

In another embodiment, a method of providing normalization of time of (e.g., synchronizing, calibrating, or providing skew compensation for) local clock circuits of two or more spatially-located receivers of respective monitoring stations comprising transmitting at least two RF pulses to define a time reference interval; detecting RF pulses at the receivers; at respective monitoring associated with the receivers, measuring durations of the time reference interval according to the detecting step; determining a relationship (e.g., ratio) between durations measured at the monitoring stations; and providing normalization of time of the local clock circuits at two or more monitoring stations according to the relationship. The method may further include counting unit increments of time (e.g., using a ring counter) to measure the time reference interval between the UWB pulses and then latching a clock count to measure the durations; and the processing step may include normalizing time-of-arrival measurements among receivers of the monitoring stations by controlling the frequency of at least one local clock circuit of a monitoring station to maintain the relationship fixed (e.g., one-to-one) with respect to a frequency of a local clock of a selected other (i.e., master) monitoring station. In a wireless scheme, the method may further include wirelessly receiving at a central processing hub digital information representing clock count information and time-of-arrival measurements of an object tag transmission; and then normalizing the time-of-arrival measurements according to the relationship.

In yet another embodiment, there is provided a time reference system for independent clocks of spatially-located wireless receivers of an object locating system that determines the position of an object. This embodiment comprises a reference tag transmitter to transmit a pair of short-pulse signals that define a time reference interval therebetween, a first wireless receiver that receives the short-pulse signals to generate a first count value according to a first local clock indicative of a time interval between pulses of the pair of short-pulse signals, a second wireless receiver that receives the short-pulse signals to generate a second count value according to a second local clock indicative of a time interval between pulses of the short-pulse signals, and a processor responsive to the first and second count values of the first and second receivers to determine an offset between the first and second local clocks whereby to enable determination of object location according to the offset. In a preferred embodiment, the first and second receivers generate digital representations of the count values and the processor hub wirelessly receives the digital representations of the first and second count values.

In yet another embodiment, a time reference system for independent clocks of spatially-located wireless receivers of an object locating system that determines the position of an object comprises a reference tag transmitter to transmit a pair of short-pulse signals that define a time reference interval therebetween, a first wireless receiver to receive the short-pulse signals to generate a first count value according to a first local clock in order to measure a time interval between pulses of the pair of short-pulse signals, a second wireless receiver to receive the short-pulse signals to generate a second count value according to a second local clock in order to measure a time interval between pulses of the short-pulse signals, and a processor responsive to the first and second count values of the first and second receivers to determine an offset and to use the offset to effect adjustment of the frequency of at least one of the first and second local clocks to maintain relative synchronization thereof.

In yet further embodiment, a method of normalizing independent clocks of respective receivers of remote monitoring stations comprises transmitting an ultra wideband (UWB) pulse pair, determining at first and second monitoring stations a respective clock count indicative of a locally measured time interval between the pulse pair, each the clock count being derived by incremental measurement of time units (e.g., by a local clock/counter/oscillator/multivibrator/delay-line/incremental time indexer/time unit measurement circuit associated with respective receivers), determining a ratio (e.g., by using programmed processor module) between clock counts of the first and second monitoring stations, and utilizing the ratio as a reference to normalize time of local clocks that generate each the clock count. The utilizing step may further include normalizing time by synchronizing local clocks that generate each the clock count or by applying a correction to time-of-arrival measurements taken at respective monitoring stations.

A further embodiment of the invention comprises a method of normalizing timing references of spatially-located receivers in a geoposition system comprising utilizing a UWB pulse pair transmission to determine offsets between clocks of the receivers.

A further embodiment of the invention comprises a method calibrating independent, spatially-located clocks of a geoposition system in order to geolocate an object having an associated object tag. The method comprises transmitting an RF pulse pair, receiving the pulse pair at multiple locations, utilizing respective frequencies of first and second spatially-located clocks to produce count values to effect measurement of an interarrival interval at each of multiple locations, determining a ratio of count values relative to the first and second spatially-located clocks, and utilizing the ratio to calibrate time indications of the clocks. This may further include utilizing a ratio of an initial pulse pair to maintain synchronization of the clocks during subsequent pulse pair transmissions; or wirelessly transmitting the count values to a central processing hub that determines object position according to the ratio.

In yet an additional embodiment of the invention, an object location system to locate an object equipped with an object tag transmitter comprises a reference transmitter to transmit at least two UWB pulses comprising short bursts of RF energy, multiple monitoring stations positionable at known locations, each including a UWB receiver and a local clock that responds to receipt of the UWB pulses to determine a clock count based on an interarrival interval, each monitoring station further including transmitter to transmit (via cable, wire, over-the-air transmission) a digital representation of the clock count to a central processing hub, and the central processing hub including a processor to compute a ratio of count values relative to first and second ones of the multiple monitoring stations and to utilize the ratio to align indications of timing references of the monitoring stations in order to determine the position of the object. Further, the processor may compute a second count value ratio between first and third ones of the monitoring stations and utilizes the first and second count values to align respective local clocks to determine the position of the object; the processor may utilize a clock count value of one of the monitoring stations as a common reference in order to compute ratios with respect to clock count values of other monitoring stations; the processor may determine object location by aligning local clocks of other monitoring stations with the first monitoring station; or the reference transmitter may transmit multiple pulse pair groups and the processor corrects indications of clock drifts among the monitoring stations in order to maintain synchronization of local clocks. The digital representation may further include a station identifier to identify respective ones of the monitoring stations and the processing hub may be co-located with one of the monitoring stations.

Other aspects of the invention will become apparent upon review of the following description and drawings. The invention, though, is pointed out with particularity by the appended claims.

DESCRIPTION OF ILLUSTRATIVE EMBODIMENTS

To help place the invention in perspective, Anderson '409 describes a "zero$^{th}$ order" technique in which times-of-arrival of a reference tag signal (as observed at spatially-located receivers) are precisely aligned using a priori knowledge of the reference tag and receiver positions (hence, a priori knowledge of reference tag propagation times from the reference tag transmitter to the individual receivers) and AP node to C node cable delays. However, as indicated above, even a small frequency offset between receiver timing circuits causes this calibration to be quickly lost.

Instead of determining timing alignment of remote clocks in multiple receivers based on time-of-flight measurement of a reference pulse and a priori knowledge of positions of the reference tag and the receivers, the present invention utilizes a relatively fixed time reference interval and a constant or known frequency offset between respective local clocks and/ or higher order differences (e.g., frequency drifts, etc.) between or among transmitter and receiver circuits of independent monitoring stations. The offset at each monitoring station is determined by measuring a time reference interval established by a pair of RF pulses, e.g., a pulse pair, of UWB pulses. In one embodiment, each UWB pulse comprises a short burst of RF energy have a few cycles. Since the time reference interval is relatively constant for a given transmission medium in a region of the monitoring stations (i.e., the signal propagation speed throughout the medium is substantially constant), the time interval between pulses of the pulse pair provides a uniform time reference or metric for the timing circuits of the spatially-located monitoring stations. In a wireless object location system employing UWB pulse transmissions, this allows for use of less expensive timing circuits for the remote clocks while maintaining sub-foot resolution in positioning accuracy.

Figure 1:
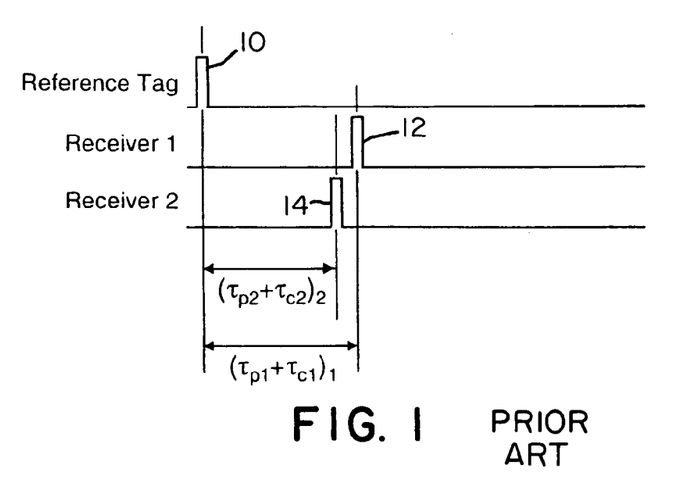
FIG. 1 illustrate a single-pulse time synchronizing technique used in a prior art system.

FIG. 1 illustrates RF timing pulses used in a prior art technique, as implemented by Anderson '409, where a single reference tag pulse transmission 10 initiates a calibration cycle to compensate for timing offsets between two (or more) receivers as reflected by the staggered times of receipt of pulses 12 and 14 at receivers 1 and 2 (not shown), respectively. This process is repeated continuously at a rate sufficient to maintain desired relative clock accuracy as indicated above, i.e., to achieve a predetermined minimal acceptable difference between expected and actual times of receipt of pulses 12 and 14 according to known locations of the reference tag transmitter and the receivers. Values $\tau_{p1}$ and $\tau_{p2}$ are a priori known propagation times of tag transmission pulse 10 from the reference tag transmitter to receivers 1 and 2, respectively. Values $\tau_{c1}$ and $\tau_{c2}$ are a priori known (i.e., measured) cable delays for receivers 1 and 2, respectively. The expression $(x)_i$ represents the value x as measured in a time coordinate system of receiver i. Thus, $\tau_{p1}+\tau_{c1})_1$ is the sum of the propagation time and cable delay for receiver 1 as measured in receiver 1's time coordinates.

Figure 2:
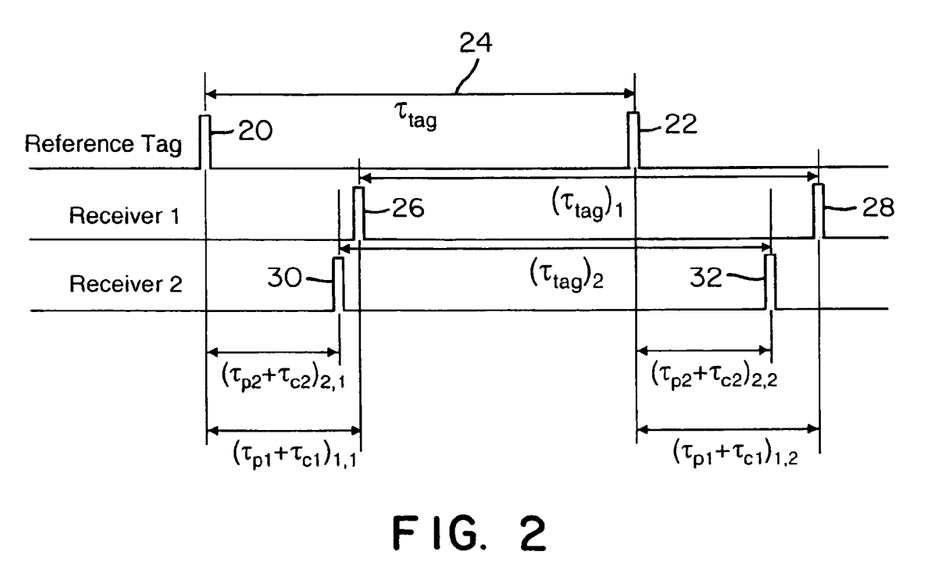
FIG. 2 shows a pulse pair reference transmission system uses in one embodiment of the present invention to determine a timing offset between remotely located monitoring stations.

FIG. 2 illustrates timing signals utilized in a first embodiment of the present invention where two reference tag transmission events 20, 22 occur. In the illustrated embodiment, events 20, 22 are very short radio-frequency (RF) or UWB pulse transmissions emitted from a remote reference tag transmitter (not shown). The interarrival (or intertransmission) time 24 (i.e., time reference interval) of pulse pair 20, 22 between these events is denoted as $\tau_{tag}$ which, in general, may be an imprecise and potentially time-varying quantity (which depends on the design and stability of internal clock circuitry driving the transmissions from the reference tag itself). Each receiver of the monitoring stations, however, receives the same reference tag transmissions (receiver 1 detects the two reference tag transmissions 20, 22 as pulse pair 26, 28 while receiver 2 detects the reference tag transmissions as pulse pair 30, 32) and, by performing a measurement of the interarrival time in their respective time coordinate reference systems, obtains an estimate of $\tau_{tag}$. As shown in FIG. 2, receiver 1 generates an estimate of interarrival time $\tau_{tag}$ as $(\tau_{tag})_1$, and receiver 2 generates an estimate of interarrival time $\tau_{tag}$ as $(\tau_{tag})_2$. The ratio of these measurements, $(\tau_{tag})_2/(\tau_{tag})_1$, provides a very good estimate of the ratio of (or skew between) the respective clock frequencies of individual receivers 1 and 2. Based on the ratio, timing differences are readily ascertainable using techniques known in the art when computing the location of an object tag. Computation techniques, in an illustrated deployment of the present invention, are more particularly described in the commonly-owned '315 Richley et al. patent.

As an example, let $\tau_{tag}$ have a nominal value of one second, and suppose that in one measurement interval $\tau_{tag}$ has an actual value of 1.000523 seconds. Further, suppose that receiver 1 and receiver 2 have known internal clock frequencies of 99.99356 MHz and 100.00118 MHz, respectively. Receiver 1 measures $\tau_{tag}$ as (1.000523)(99.99356 MHz)=100045857 clock counts, and receiver 2 measures $\tau_{tag}$ as (1.00523)(100.00118 MHz)=100053481 clock counts. Clock counts may be measured by methods and circuit known in the art, or by methods and circuits described in the '315 patent, such as free-running counters, multi-vibrators, digital counters, tapped delay lines, and/or other circuits. The ratio of these two count values, or 100053481/

100045857=1.0000762=8, is an extremely close estimate (for a high frequency clock) of the ratio of the two individual clock frequencies. Note also that, if the next interarrival time between a subsequent pulse pair transmission from the reference tag is 1.000289 seconds (e.g., due to frequency drift of the reference tag transmitter clock), the new counts are now 100022458 for receiver 1 and 100030080 for receiver 2, but the ratio remains constant, i.e., 100030080/100022458=1.0000762 as before. Thus, the actual time spacing between pulse pair transmissions of the reference tag becomes irrelevant to achieving positioning accuracy, as is its precise position in space (as required by the Anderson '409 patent).

To describe an exemplary embodiment to determine the ratio, a local processor at each monitoring station captures, digitizes, and wirelessly transmits clock count information to a remote processing hub thereby to enable mathematical determination of correct times of arrival of subsequent object tag signals at the processing hub. Alternatively, the monitoring stations themselves may broadcast their clock count information with an ID message so that the other monitoring stations receive these clock counts and locally determine a ratio relative to a selected one of the monitoring stations, i.e., a master. Thus, the ratio may be locally used to perform time correction or alignment locally. In an exemplary implementation, the frequency of the local clock at each monitoring station may be varied (e.g., using a voltage controlled oscillator) in order to maintain a one-to-one clock count ratio with the clock count of a master monitoring station. This way, all clocks are coherent in frequency and no further time correction would be required (except for internal cable or other delays) to measure the time of arrival of a subsequent object tag transmission.

With knowledge of the ratio δ for any initial or subsequent stabilized reference tag transmission, the frequency ($f_2$) of receiver clock 2 can then be corrected to be equal to the frequency ($f_1$) of receiver clock 1 since $f_2 \sim f_1 \cdot \delta$ for any or all subsequent measurements. In general, for any number N of untethered receivers, each receiver clock can be precisely referenced to that of one of the other receivers. With equal, or near equal, local clock frequencies among the individual receivers, the wireline approach described in the U.S. Pat. No. 6,882,315 patent can now be followed to attain a remote wireless object location system or method for the precision location of arbitrary object tags.

Advantageously, a system or method according to the present invention is unaffected by changes (drifts) in intertransmission time of the reference tag pulse pair. Instead of transmitting a pair of pulses (or multiple pairs) to define a time reference interval, a series of three or more pulses may be transmitted and intervals between any one or more pulses may be used as a timing reference interval. Also, the timing reference interval may comprise an average of multiple intervals that lie between multiple pulses. Further, no knowledge of the reference tag position is required in a system or method of the present invention since the computational results are unaffected by tag position and primarily depend on the duration of the reference interval between pulses.

For better accuracy, the reference tag interval and nominal receiver clock frequency should be large enough so that the product of these two values produces a count value with sufficient gradations to yield a good estimate when taking the ratios of these values. On the other hand, the reference tag interval between pulse pairs must also be short enough so that the assumption of a constant frequency offset is satisfied. For example, in the case where temperature fluctuations occur, the assumption of a constant frequency offset may not be satisfied over very long interarrival times.

In practice, it has been found that a one-second update rate is adequate to provide a wireless remote object location system or method having the same or similar accuracy and resolution as the wired counterpart described in the U.S. Pat. No. 6,882,315 patent, i.e. one foot or less. Note that this update rate is many orders of magnitude lower than what would be required for a comparable positioning accuracy using the approach described in the Anderson '409 patent.

Figure 3:
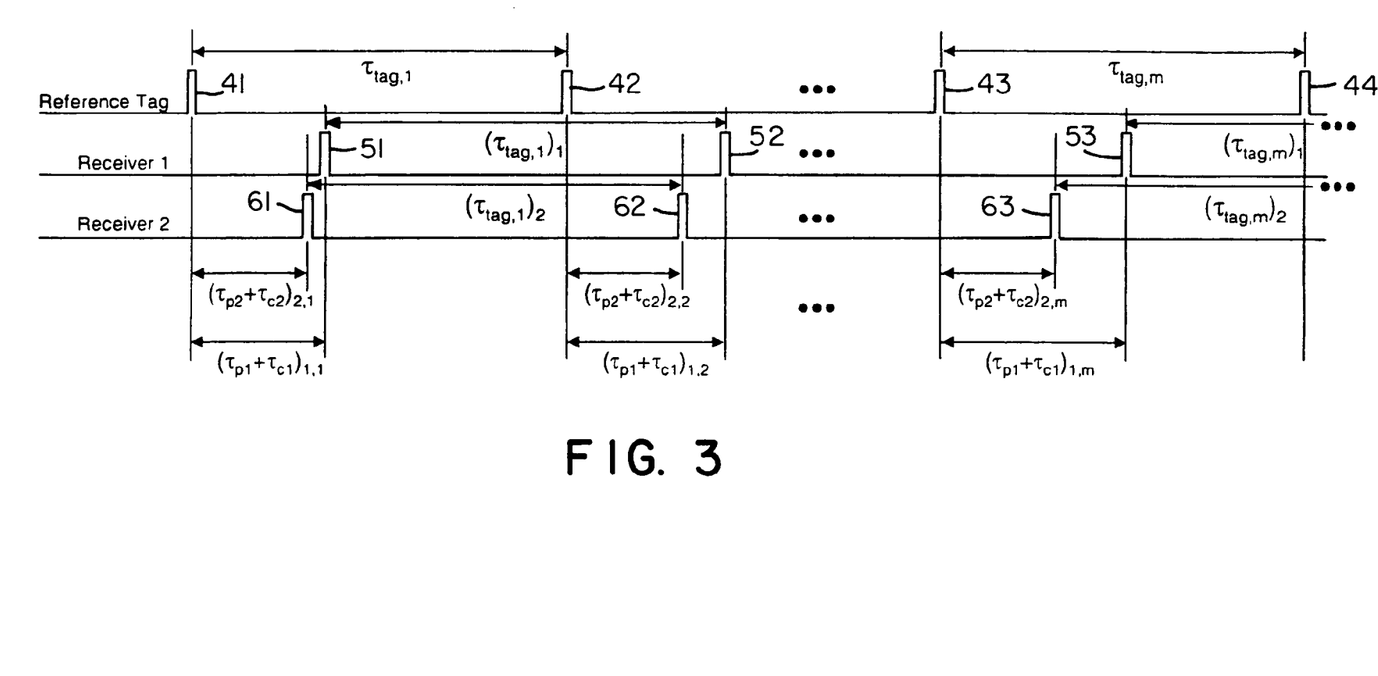
FIG. 3 shows multiple pulse pair groups used for maintaining alignment of remote receiver clocks on an on-going basis.

The embodiment described above can be further generalized as shown in FIG. 3. Here, multiple pulse pairs 41-42, 43-44 having reference tag interarrival times $\tau_{tag,i}$, for i=1, 2, . . . are measured with corresponding estimates of received pulse pairs 51-52, 61-62, 53-54, 63-64 (not all pulse pairs shown) from each $j^{th}$ receiver 1, 2, . . . $\{\tau_{tag,i}\}_j$, for j=1, 2, . . . . If the computed ratio δ changes from an $m^{th}$ interval to a next interval, the invention advantageously enables correction of clock frequencies not only for constant offsets, but also for constant accelerations (i.e., frequency drift) and/or higher order effects.

The above techniques can be used to remotely and wirelessly adjust each receiver clock to the same frequency, with subsequent phase locking of the cycling thereof then performed using reference tag information as described in the U.S. Pat. No. 6,882,315 patent. Furthermore, the digital data stream that is sent from each receiver to the hub/processor node in the U.S. Pat. No. 6,882,315 patent can now be wirelessly transmitted as well to the hub/processor by using standard, off-the-shelf, wireless technologies such as ISM-band, 802.11a/b/g, or other wireless technique.

Figure 4:
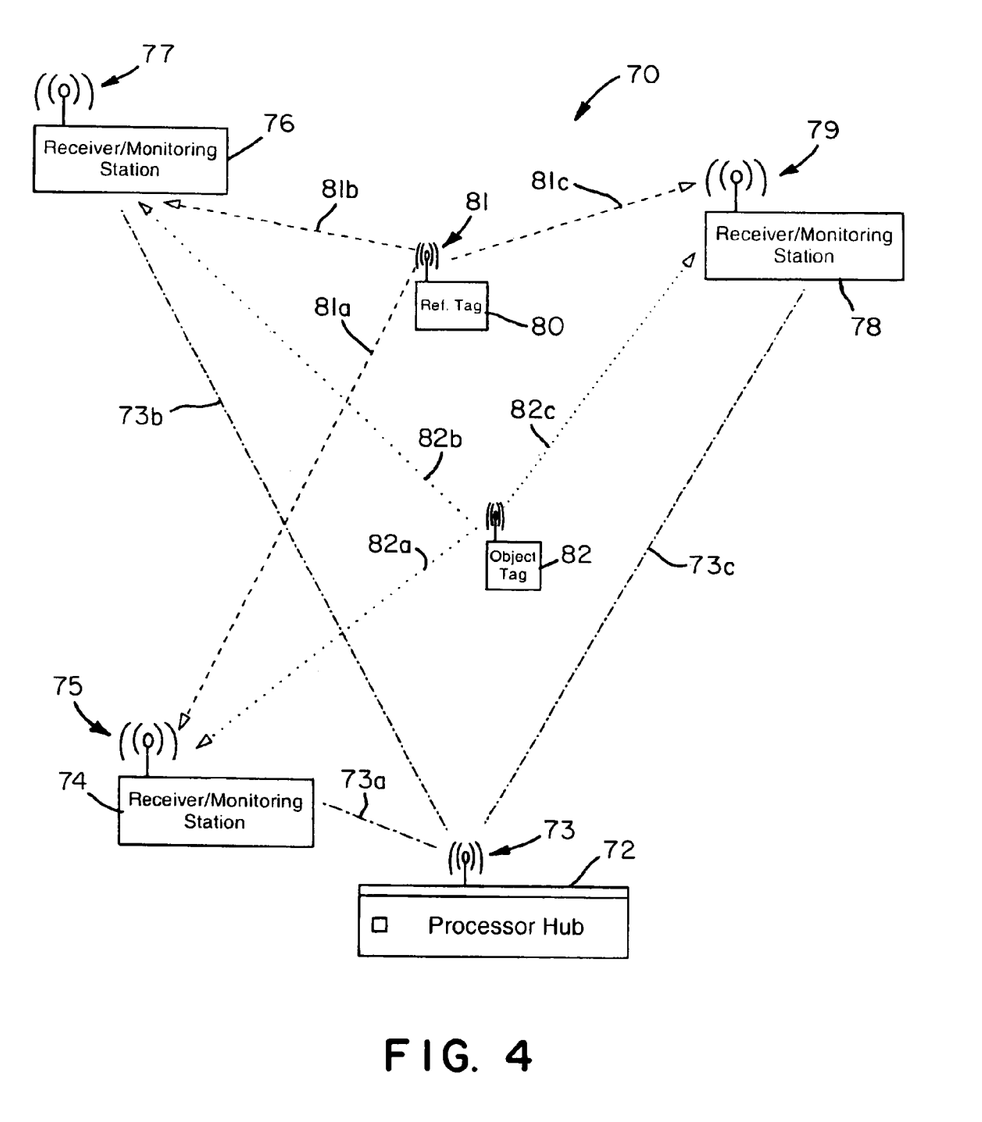
FIG. 4 illustrates a system implementation of the wireless object location technique described in connection with FIG. 2 in accordance with an aspect of the present invention.

FIG. 4 shows one of many implementations of the invention, such as in a wireless object location system 70 in which a processing hub 72 includes an antenna 73 to convey digital data to or from a number of receivers or monitoring stations 74, 76, and 78 via wireless links 73a, 73b, and 73c. Alternatively, as indicated herein, any one or each of the monitoring stations may include the functionality of processing hub to effect alignment of the clock frequencies, locally. Transceivers of monitoring stations 74, 76, and 78 link with processor hub 72 through wireless transmissions with respective antennas 75, 77, and 79. A local processor and/or timing circuit within the monitoring stations generate count value information based on the duration of an interarrival interval detected in a pulse pair transmission from reference tag 80, preferably a UWB pulse pair transmission from antenna 81. The UWB pulse pair transmission travels along paths 81a, 81b, and 81c to the antennas 75, 77, and 79 of respective monitoring stations 74, 76, and 78. As indicated above, processor hub 72 may obtain the count value information via a conventional wireless transmission protocol and such information may be conveyed after a polling operation performed or initiated by hub 72, or alternatively, the monitoring stations may transmit their count values sua sponte either periodically or at other predefined intervals. In another embodiment, processor hub may be hardwired with any one or more of the monitoring stations as described in the '315 patent, if desired or practicable, but still implement the synchronization or time correction methods and systems described herein. Wireless transmissions from the monitoring stations may include station ID or other information as described in incorporated '315 patent according to any air interface protocols (e.g., IEEE wireless transmission protocols). Optionally, hub 72 may be a standalone unit or colocated with any of the monitoring stations. Moreover, the reference tag transmitter 80 may also be colocated with the processor hub 72 or any one of the monitoring stations.

In order to maintain synchronization, reference tag 80 may transmit UWB pulse pairs every second, more or less, or at any other interval (periodic or non-periodic). With accurate offset information on hand in the form of count values, e.g., count values may be stored in a memory, processor hub 72 computes alignment variances between and among local clocks (e.g., ring counters) of the monitoring stations so that accurate time-of-arrival data may properly be determined or calculated upon detecting subsequent UWB transmissions from object tag 82. Paths 82a, 82b, and 82c respectively convey UWB transmissions from the object tag 82 to the monitoring stations 74, 76, and 78. Such UWB transmissions may also include ID or other information, as described in incorporated '315 patent, which enables multiple objects to be geolocated simultaneously. Instead of UWB transmissions, the invention may employ short or wideband RF pulses.

Figure 5:
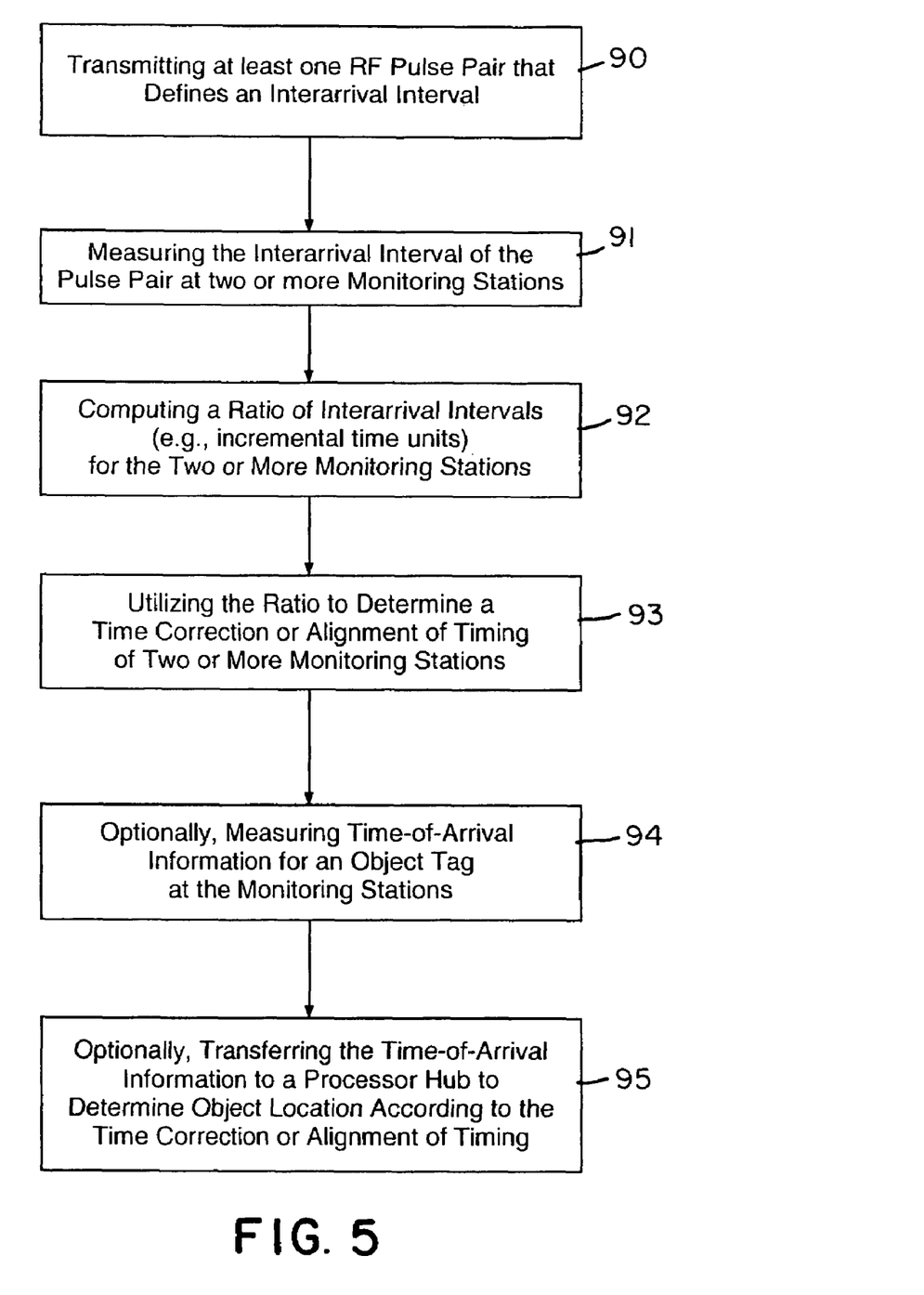
FIG. 5 is a flow chart of a method aspect of the present invention.

FIG. 5 illustrates a method according to an aspect of the invention where, at step 90, an RF pulse pair is transmitted to define an intertransmission interval, and correspondingly, an interarrival interval when later received at a monitoring. The pulse pair may comprise two UWB or wideband pulse transmissions. Step 91 includes measuring the interarrival interval associated with the pulse pair transmission at two or more receiving or monitoring stations. In one embodiment, the interarrival interval may be defined by and measured at the rising edge of each of the initial and following pulses of the pulse pair transmission but this interval may also be defined by and measured at other points on the pulse waveform. Measuring may be performed by conventional techniques known in the art, including deploying a ring counter to count equal increments of time during the interval, and then latching a count value at the end of the interval. After measuring the interarrival interval, a ratio of count values between at least two monitoring stations is computed at Step 92. This ratio indicates the ratio of local clock frequencies of two monitoring stations and thus indicates misalignment of the clocks for subsequently determining, at step 93, a corrected time-of-arrival of a subsequently transmitted pulse received at the monitoring stations. The ratio is preferably determined at a central processing hub but may be determined locally at any one or all monitoring stations if count value information is shared, i.e., broadcasted among the monitoring stations. In addition, one monitoring station may serve as a common master reference for all other monitoring stations to align local clocks of all monitoring stations.

At step 94, time-of-arrival of a subsequent pulse is measured, e.g., by latching the count status or count value of a cyclic counter as described in the incorporated '315 patent. The latched value, at step 95, may then be transmitted to a central processor hub in order to determine, with the use of counter skew or count value information, the location of the object that transmitted a subsequent object tag pulse.

Figure 6:
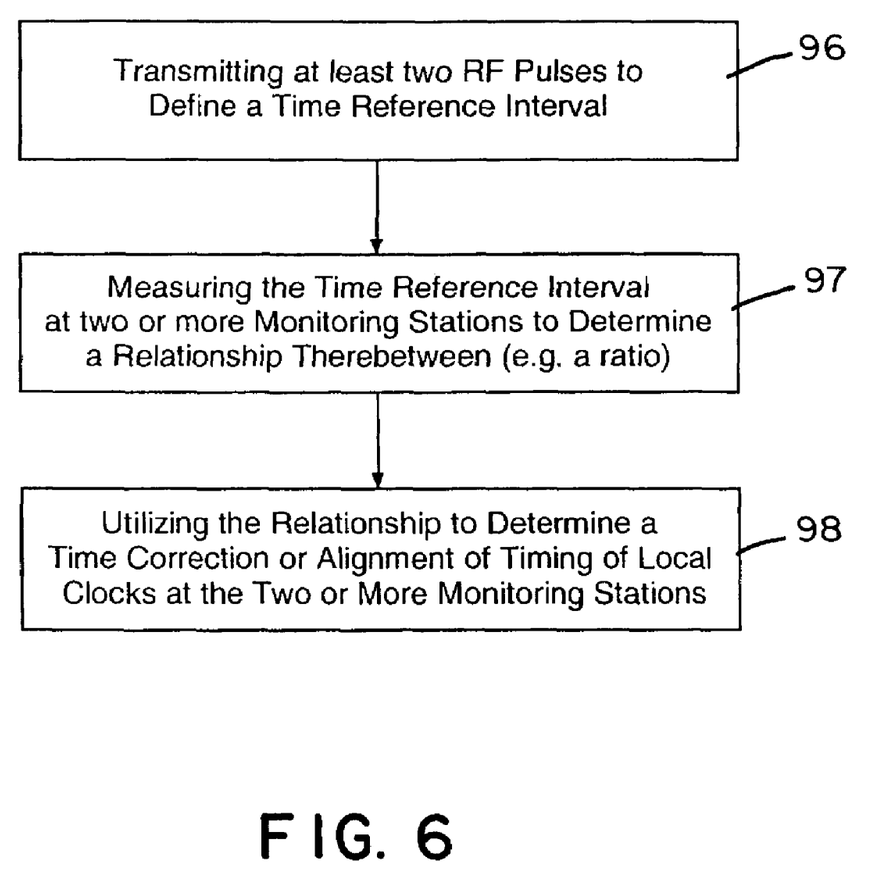
FIG. 6 depicts a broader aspect of the method contemplated by the present invention.

FIG. 6 depicts a broader aspect of the method contemplated by the present invention where the method simply comprises of transmitting 96 at least two RF pulses to define a time reference interval, measuring 97 the time reference interval at two or more monitoring stations to ascertain a relationship therebetween (e.g., a ratio or other mathematical relationship), and utilizing 98 the relationship to determine a time correction in computing object location or aligning local clock frequencies at two or more monitoring stations. Time correction is preferably performed in software by adjusting the actual time-of-flight measurements of object tag transmissions according to the relationship. Alternatively, the relationship (e.g., ratio) may be used to align local clocks, e.g., to alter and/or control local clock frequency of one or more local clocks to achieve and maintain a one-to-one or other fixed relationship between two or more local clock frequencies.

Figure 7:
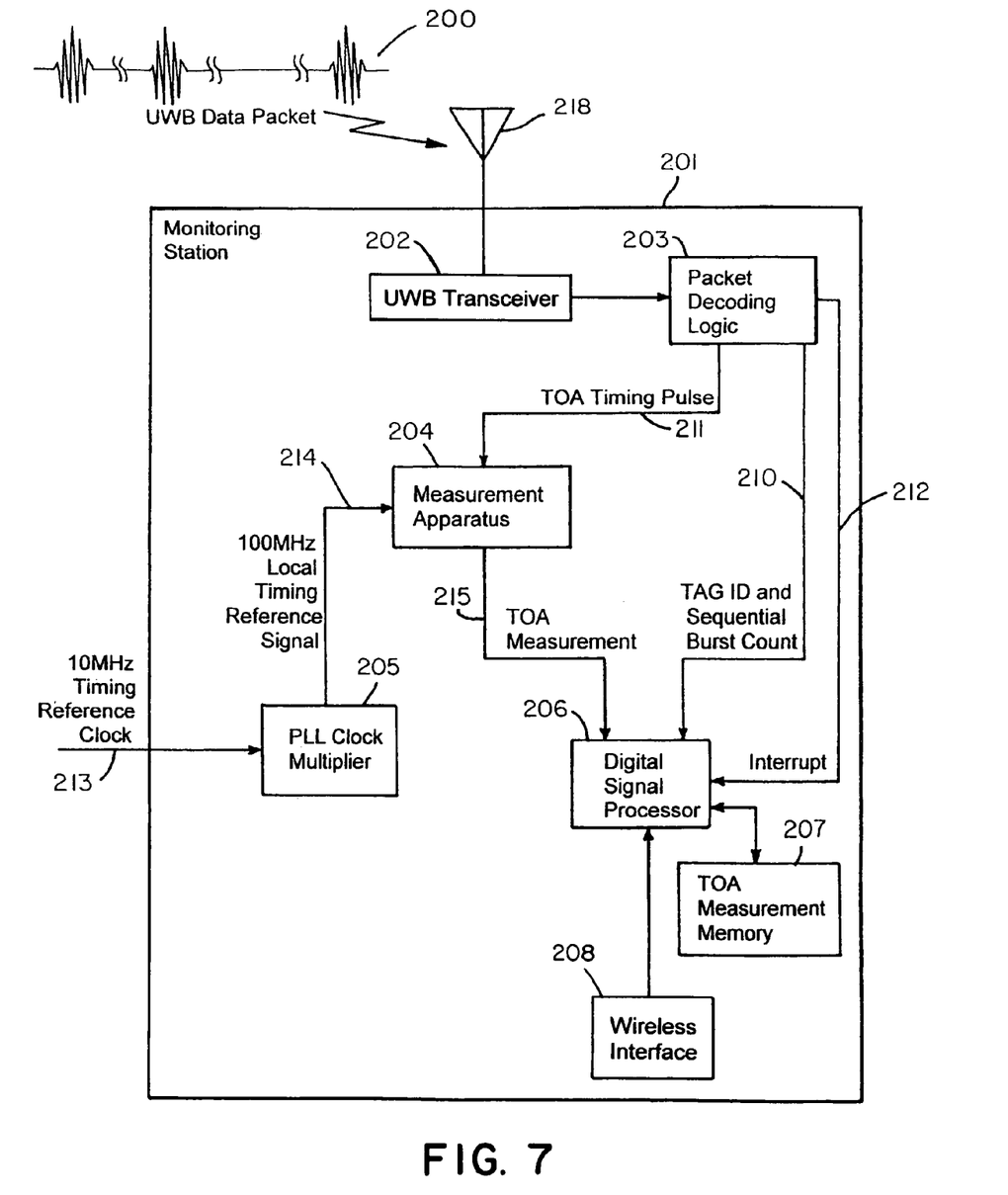
FIG. 7 illustrates a simplified block diagram of a monitoring station.

FIG. 7 shows a block diagram of an exemplary monitoring station 74 (FIG. 4) which includes a measurement apparatus 204 at each of the monitoring stations. Since computations are performed or measurements are taken at each monitoring, digital, rather than analog, signals may be transmitted to processing hub 72 (FIG. 4). Thus, cable dispersion, which may degrade the integrity of analog waveforms, is avoided.

In a preferred embodiment, Ultra Wideband (UWB) radio data packets 200 are transmitted to the monitoring station 201 and intercepted by UWB antenna 218. A UWB transceiver 202 is provided at each monitoring station. The transceiver can, for example, be designed in accordance with the system described in commonly-owned, incorporated U.S. Pat. No. 5,901,172.

UWB transceiver 202 produces a digital bit stream that is processed by packet decoding logic 203, which performs packet framing and bit timing as part of an isochronous communication system. In an isochronous system, the communication signals carry timing information embedded as part of the signal. Upon receiving a complete UWB data packet, packet decoding logic 203 generates and sends an interrupt signal on line 212 to the digital signal processor (DSP) 206. Tag ID and a sequential burst count 210 are also extracted from the packet, and are sent to the DSP for further processing. Packet decoding logic 203 also generates a TOA timing pulse 211 that is precisely referenced in time relative to the beginning or end of a UWB data packet synchronization preamble. The synchronization preamble may comprise a few bits of data having a unique pattern at the beginning of the UWB packet burst so that the UWB transceiver 202 may determine the validity of the received packet as well as bit time alignment. The TOA timing pulse is subsequently measured by measurement apparatus 204, which functions as a time-to-digital converter. An output TOA measurement 215 is a digital result that is determined in response receipt of the TOA timing pulse.

Upon receiving an interrupt signal, DSP 206 reads the TOA measurement 215 along with the optional tag ID and sequential burst count 210, and stores the combined information in the TOA measurement memory 207. Any additional information decoded by the packet decoding logic 203 (e.g., personnel data, cargo manifest, etc.) can also be stored in memory at this time. In a preferred embodiment, the TOA measurement memory 207 operates as a First-In First-Out (FIFO) buffer. Also, in the preferred embodiment, a program (which is typically stored in a FLASH memory, not shown) manages a portion of a general-purpose static RAM to function as the TOA measurement memory FIFO.

Because packet data and measurement results can be transferred at high speeds to TOA measurement memory, the monitoring station 201 can receive and process tag (and corresponding object) locating signals on a nearly continuous basis. That is, multiple UWB data packets can be processed in close succession thereby allowing the use of hundreds to thousands of tag transmitters. Data stored in TOA measurement memory 207 is wirelessly transmitted to the processing hub 72 (FIG. 2) via a wireless network interface 208 in response to a specific request from the processing hub 72. Thus a low-cost, high-latency data network can be used while retaining the ability to continuously receive tag locating signals.

In addition, wireless interface 208 has is bi-directional. Interface 208 may convey command signals from the processing hub to, for example, instruct DSP 206 to transfer the contents of the TOA measurement memory 207 to the processing hub 72. Additional commands include those to adjust UWB transceiver operating characteristics such as gain and detection thresholds.

Within the monitoring station 201, a timing reference clock signal on line 213 is frequency-multiplied using well-known techniques by phased-lock loop (PLL) clock multiplier 205 (e.g., Pericom PI6C918AW), thereby producing a local timing reference signal on line 214. In one embodiment, the timing reference clock signal on line 213 may have a local clock frequency of 10 MHz, and the local timing reference signal on line 214 is generated at 100 MHz (i.e., a 10× digital multiplication factor). Alternatively, a 100 MHz crystal oscillator may be used to produce a local clock signal.

Figure 8:
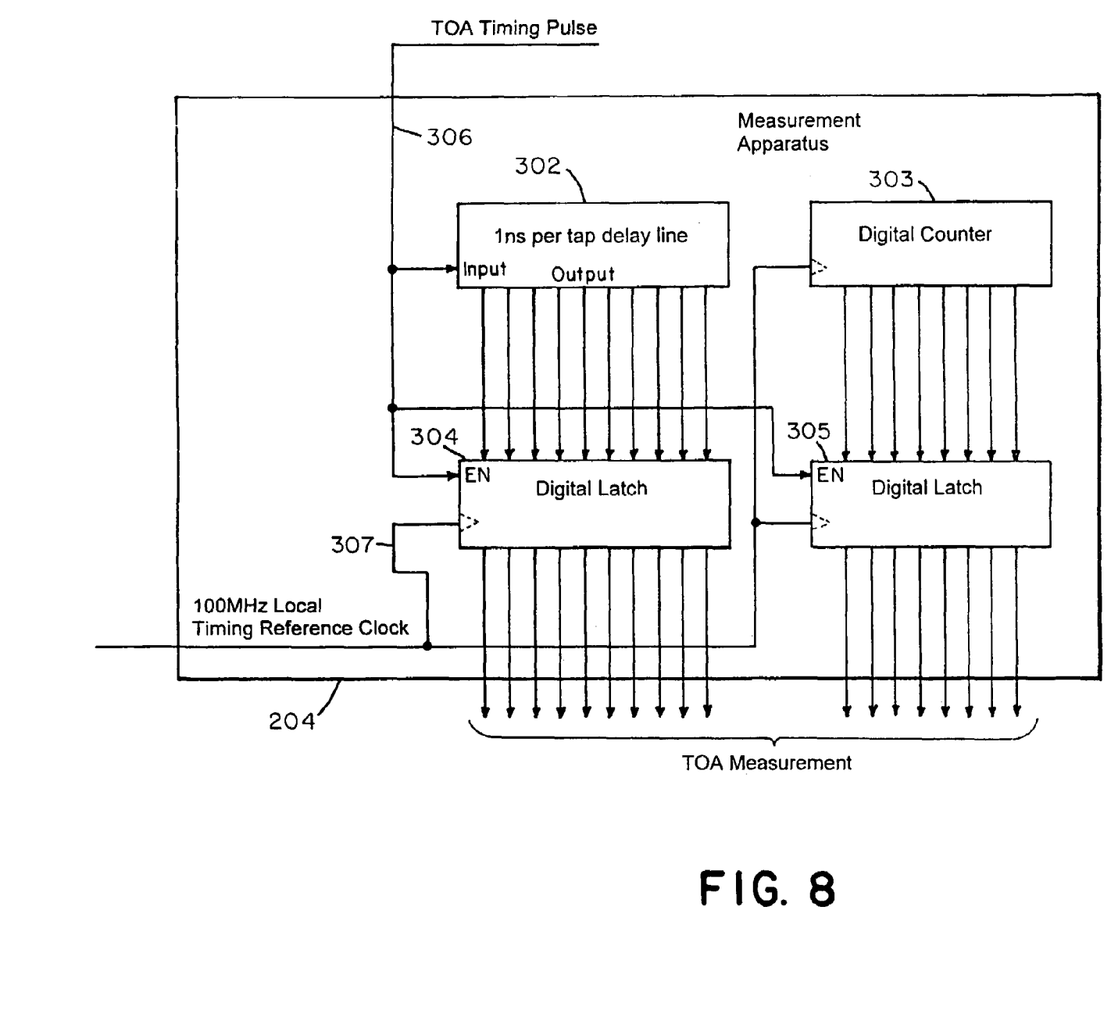
FIG. 8 depicts a measurement apparatus within a monitoring station of FIG. 7.

FIG. 8 is a block diagram of an example embodiment of the measurement apparatus 204 (FIG. 7). The TOA timing pulse 306 generated by the packet decoding logic 203 (FIG. 7) is coupled to the input of delay line 302 as well as to the enable input of digital latches 304 and 305. This timing pulse is indicative of the total propagation delay between the tag transmitter and the UWB receiver antenna 218.

The timing pulse is asynchronous with respect to the local timing reference signal. Therefore, following the assertion of the timing pulse, the next rising edge of the local timing reference signal causes the latches to capture the instantaneous outputs of delay line 302 and output of digital counter 303.

Figure 9:
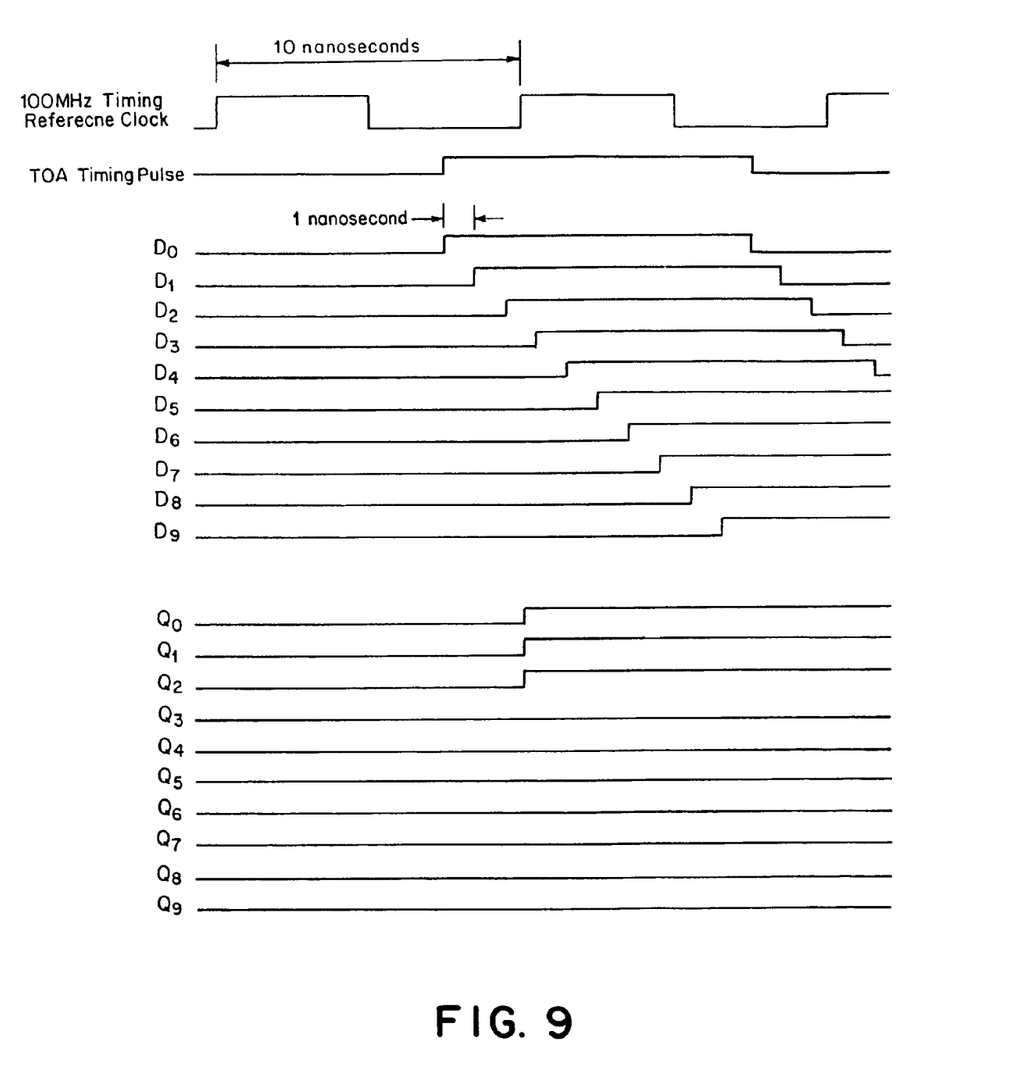
FIG. 9 illustrates waveform diagrams for delay line and latch operations.

In the example of FIG. 8, counter 303 runs at a clock frequency of 100 MHz. Thus, the value of latch 305 has a ten-nanosecond timing resolution. This is too coarse to be used in most applications, thus, an additional delay line 302 is also provided. Delay line 302 allows measurement of fine-resolution timing differences between the TOA timing pulse and the local timing reference signal. In this same example, delay line 302 has a one-nanosecond delay per tap. Delay taps of less than one nanosecond separation can be used to achieve even finer range resolution. Waveforms associated with delay line 302 are shown in FIG. 9, which illustrates waveforms corresponding to the D inputs and Q outputs of latch 304 when the timing pulse arrives three nanoseconds in advance of the rising edge of the local timing reference signal.

Figure 10A:
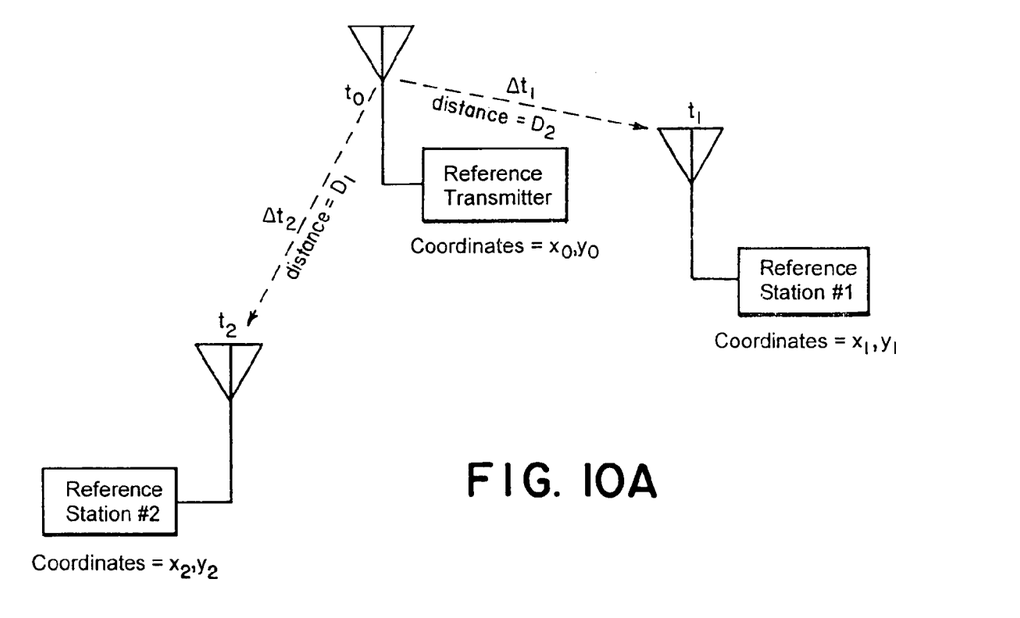
FIGS. 10A and 10B illustrate phase offset between signal counters of respective monitoring stations.
Figure 10B:
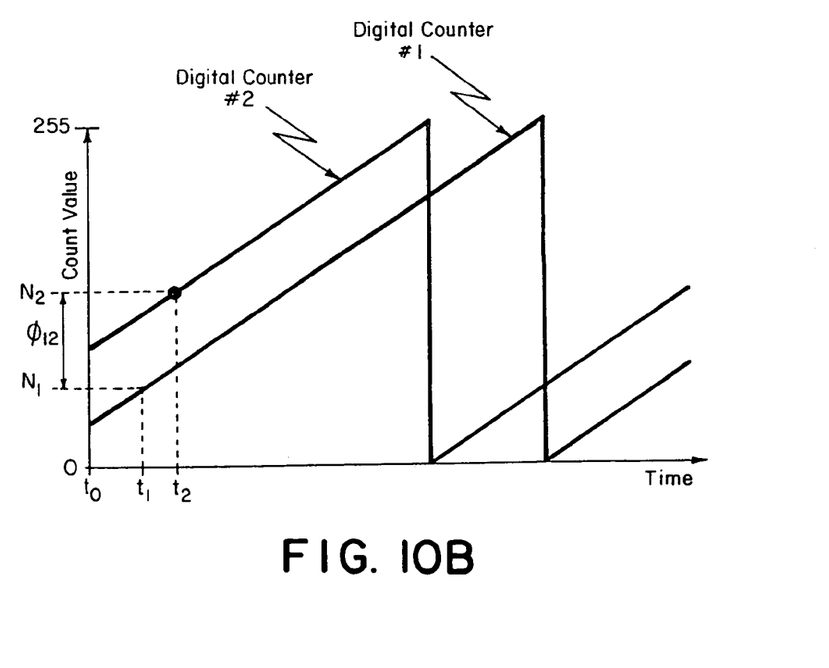

FIGS. 10A and 10B illustrate a phase offset compensation technique. In general, there are two forms of synchronization—frequency and phase. In a frequency-synchronized or locked system, such as illustrated herein, there is no relative drift between time measurement apparatus, although there may be a relative fixed phase offset. In other words, a plurality of frequency-locked counters (each located within a separate measurement apparatus 204 (FIG. 7)) preferably count at the same rate. However, the counters are not necessarily aligned to the same count value at any given instant in time. This difference is referred to as relative phase offset and is illustrated by the graph of count values versus time in FIG. 10B. Note that digital counters #1 and #2 associated with the respective waveforms 256 and 257 have different count values at any given point in time.

The problem of phase alignment is typically solved through the use of a counter reset or phase synchronization signal. In contrast, the present invention may utilize non-resettable counters. During operation, the counters have random, but constant, phase offsets. To compensate for relative phase offsets, a reference transmitter is positioned at known coordinates. This transmitter transmits a unique ID code to allow the above-described processing algorithm to identify latched count values corresponding to signals received from this particular transmitter. Since the locations of the transmitter and receivers are all known, the exact phase offsets between counters can be readily deduced as described above.

The illustrated embodiments disclosed herein set forth various approaches to provide a way to wirelessly calibrate or synchronize the frequencies of independent receivers of a precision geolocation or time referencing system using two or more pulse transmissions from one or more reference tags to define a time reference interval. As used herein, a pulse pair may be derived from a series of two or more pulses where an intertransmission (or interarrival) interval lies between any two pulses within the series of pulses. Instead of utilizing offset information at a processing end to adjust of time-of-arrival of object tag signals to determine object location, the offset or representation thereof may be fed back to the individual receivers to make internal adjustments in clock frequency to maintain uniformity or synchronization in internal clocks. UWB pulse transmissions enable good resolution due to their short duration but wideband transmissions may, in certain circumstance, also be acceptable. Where extreme position accuracy is not required, conventional lower frequency or narrower band RF pulse transmissions may be utilized. The invention has applications beyond object location (e.g., navigation, remote timing, or other applications), thus the disclosure a geopositioning is not intended to limit the invention to that field. Unlike prior systems and methods, the actual location of the reference tag need not be known, nor is it required to tightly control the duration of the time reference interval transmitted by the reference tag. Using time differences of arrival, clock ratios may be computed for each monitoring station relative to one monitoring station chosen as reference, i.e., master. These clock ratios are then used to adjust the relative clock frequency of each receiver to precisely match that of the master. Finally, with all receivers adjusted for frequency lock, the method and system of the U.S. Pat. No. 6,882,315 patent can be used to determine the precise position of all (non-reference) tags within the area of receiver coverage.

In addition to deploying the invention in an object location system, other applications include vehicle guidance and navigation which is also a form of object location. Vehicles include land, sea, air, and space vehicles including motor vehicles, marine vessels, and aircraft where present day expensive systems may be replaced with low-cost systems provided by the present invention. The invention may also be deployed in earth tunneling and boring machines to accurately guide the machine through the earth. Using ultra wideband in this application is particular advantageous due to earth penetration advantages of UWB signals. Satellite navigation system may also employ the methods and systems herein for timing reference or correction.

Accordingly, the invention is not limited to the embodiments shown and described herein but includes subject matter embraced by the appended claims.

We claim:

1. A method of providing normalization of time of local clock circuits of two or more spatially-located receivers of respective monitoring stations, said method comprising:
   transmitting at least two RF pulses to define a time reference interval;
   detecting said RF pulses at said receivers;
   at respective monitoring associated with said receivers, measuring durations of said time reference interval according to said detecting step;
   determining a relationship between durations measured at said monitoring stations; and
   providing normalization of time of said local clock circuits at two or more monitoring stations according to said relationship.

2. The method of claim 1, wherein said transmitting step further includes transmitting at least two UWB pulses that each comprise a signal burst of a few cycles of RF energy.

3. The method of claim 2, wherein:
said measuring step includes counting unit increments of time to measure said time reference interval between said UWB pulses and latching a clock count to measure said durations; and
said processing step includes normalizing time-of-arrival measurements among receivers of said monitoring stations by controlling the frequency of at least one local clock circuit of a monitoring station to maintain the relationship fixed with respect to a frequency of a local clock of a selected master monitoring station.

4. The method of claim 3, further comprising:
wirelessly receiving at a central processing hub digital information representing clock count information and time-of-arrival measurements of an object tag transmission; and
normalizing said time-of-arrival measurements according to said relationship.

5. The method of claim 2, further comprising providing a ring counter to measure said time reference interval between said UWB pulses and latching a clock count to measure said durations.

6. A method of normalizing independent clocks of respective receivers of remote monitoring stations, said method comprising:
transmitting an ultra wideband (UWB) pulse pair,
determining at first and second monitoring stations a respective clock count indicative of a locally measured time interval between said pulse pair, each said clock count being derived by incremental measurement of time units,
determining a ratio between clock counts of said first and second monitoring stations using programmed processor module, and
utilizing said ratio as a reference to normalize time of local clocks that generate each said clock count.

7. The method of claim 6, wherein said utilizing step includes normalizing time by synchronizing local clocks that generate each said clock count.

8. The method of claim 6, wherein said utilizing step includes normalizing time by applying a correction to time-of-arrival measurements taken at respective monitoring stations.

* * * * *